United States Patent [19]
Brown

[11] Patent Number: 6,107,786
[45] Date of Patent: Aug. 22, 2000

[54] ACTIVE OUTPUT POWER WAVEFORM TRANSITION CONTROL FOR A STEP-DOWN VOLTAGE REGULATOR

[75] Inventor: Alan E. Brown, Austin, Tex.

[73] Assignee: Dell USA, L.P., Round Rock, Tex.

[21] Appl. No.: 08/268,682

[22] Filed: Jun. 23, 1994

[51] Int. Cl.[7] .................................................. H02M 3/158
[52] U.S. Cl. ........................................... 323/224; 323/283
[58] Field of Search ................................... 323/224, 282, 323/283, 284

[56] References Cited

U.S. PATENT DOCUMENTS 4,958,121  9/1990  Cuomo et al. ........................ 323/224

*Primary Examiner*—Jessica Han
*Attorney, Agent, or Firm*—Haynes and Boone LLP

[57] ABSTRACT

A switching voltage regulator and a method of providing transition control therein. The regulator includes: (1) a modulation circuit for generating switching signals, (2) first and second switches coupled between a regulator output of the voltage regulator and respective first and second voltage inputs, control inputs of the switches coupled to the modulation circuit to allow the switches to couple the regulator output alternately between the voltage inputs as a function of a state of the switching signals and (3) a regulator output power waveform transition control circuit coupled to the control inputs of the switches for generating an override signal to the control inputs under a specified condition, the override signal causing the switches to couple the regulator output to the first voltage input independent of the state of the switching signals.

48 Claims, 3 Drawing Sheets

ACTIVE OUTPUT POWER WAVEFORM TRANSITION CONTROL FOR A STEP-DOWN VOLTAGE REGULATOR

TECHNICAL FIELD OF THE INVENTION

The present invention is directed, in general, to a voltage regulator and, more particularly, to an active control for a voltage regulator that limits voltage differences across the regulator during start-up and shutdown periods.

BACKGROUND OF THE INVENTION

In modern computer systems, and in particular, personal computers ("PCs"), it is important to ensure that the electric power delivered to electronic components is of the highest quality. "Quality electric power" refers to an electric waveform that is of substantially constant amplitude (or voltage) and wavelength (or frequency) and that is substantially free from other waveform distortions or anomalies, whether periodic (such as harmonic distortion) or aperiodic (such as voltage spikes). If electronic components are not supplied with such high quality power, they may be susceptible to aberrant activity, shortened lifespan or, in extreme cases, outright immediate failure.

In earlier PCs, the electronic components forming the logic circuits therein functioned with a supply of 5 volt power (so-called transistor-transistor logic ("TTL") level power). Most often, power supplies for these computers used solid state switching technology to step down voltage from 110 volt standard household voltage to the required 5 volts. (Power supplies also provided 12 volt power for electrically erasable programmable read-only memory ("EEPROM"), fans, disk drive motors and the like.) These so-called switching power supplies varied the duty cycle of solid state switches coupling the household voltage source to the electronic components. For instance, to step down 110 volts to only 5, the switches was rapidly toggled on and off, coupling the electronic components to the 110 volt source only approximately $5/110$ths of the time. This switching produced a crenelated, "square wave" output waveform that, with the help of subsequent filtering, became smoothed and suitable for the electronic components.

The latest generation of PCs employ electronic components for their logic circuitry that require two different voltages of electric power to operate. Some components adhere to the previous 5 volt standard. In the quest to reduce power density and concomitant heat production, newer components (particularly new generations of microprocessor central processing units ("CPUs")) take advantage of newer semiconductor technology and require only 3.3 volts to operate.

Therefore, power supplies have had to be redesigned to supply not only 5 volts, but also 3.3 volts. One way of providing this extra voltage level was to employ a step-down or "buck" voltage regulator to produce the 3.3 volt power. Such regulators typically tap off of the 5 volt power line and, via switching technology, buck the voltage down to 3.3 volts. These regulators functioned well in their steady state, that is, when they were left on. However, in transitions, such as when they were turned on or off, they became susceptible to excessive voltage differences that temporarily existed between their outputs and their inputs.

For instance, one such prior art regulator (to be illustrated and described in greater particularity in the Detailed Description to follow) employed a pulse width modulation ("PWM") circuit, having a noninverted output and an inverted output. The noninverted output was coupled to a control input of a solid state switch coupling an output of the regulator to a 5 volt source. The inverted output was coupled to the control input of a second solid state switch coupling the output of the regulator to ground. The PWM modulation circuit fed synchronous switching signals to the switches to switch alternatively. When one switch was on (for instance, coupling the output of the regulator to the 5 volt source), the other switch was off (so as not to short the 5 volt source to ground, a so-called "shoot-through"), and vice versa.

When the regulator was first switched on, the 5 volt source came on almost immediately, but it took more time for the output voltage to rise to the proper 3.3 volt level (the output had a slower slew rate). This caused a temporary excessive voltage difference to exist between the input and the output, damaging or destroying components within the computer (particularly at-risk was the computer's CPU). Likewise, at power-down, the regulator output voltage dropped more rapidly than the 5 volt source, again causing a harmful excess voltage difference.

In response, regulator designers provided bidirectional diodes bridging the source and the output to limit the amount of voltage difference that is allowed to exist. Unfortunately, the diode protection amounted to a simple limit on the maximum amount of voltage difference that will be tolerated, rather than providing an active control of voltage difference during the transition.

Besides failing to provide an active control of voltage differences, the prior art passive diode "protection" suffered two other notable disadvantages. First, diode forward voltage response curves varied drastically over forward current, allowing the maximum tolerable voltage difference to vary wildly. Second, $I^2T$ limits inherent in the diodes were sometimes exceeded during conditions of overcurrent or short circuit load, causing the diodes to fail open or shorted, defeating their function and subjecting the sensitive electronic components of the PC to unacceptable power quality.

Accordingly, what is needed in the art is an active control for a voltage regulator that minimizes voltages differences across the regulator during transitions and is not subject to failure modes experienced by passive diodes.

SUMMARY OF THE INVENTION

To address the above-discussed deficiencies of the prior art, it is a primary object of the present invention to provide an active output power waveform transition control for a voltage regulator that minimizes excessive voltage differences across the regulator by improving the response time of the output thereof.

Accordingly, in the attainment of the above primary objective, the present invention provides a switching voltage regulator comprising: (1) a modulation circuit for generating switching signals, (2) first and second switches coupled between a regulator output of the voltage regulator and respective first and second voltage inputs, control inputs of the switches coupled to the modulation circuit to allow the switches to couple the regulator output alternately between the voltage inputs as a function of a state of the switching signals and (3) a regulator output power waveform transition control circuit coupled to the control inputs of the switches for generating an override signal to the control inputs under a specified condition, the override signal causing the switches to couple the regulator output to the first voltage input independent of the state of the switching signals.

The present invention therefore actively controls the voltage of the regulator output, rather than simply limiting a voltage differential across the regulator. In a preferred embodiment of the present invention, the first voltage input is of higher voltage than the second voltage input. Therefore, the voltage regulator is preferably a buck regulator, wherein a voltage of the regulator output is between voltages of the first and second voltage inputs. Further, the present invention operates to couple the regulator output to the higher voltage input during times of transition. This ensures that there is no appreciable voltage drop or differential across the regulator during transition. The regulator output voltage rise tracks that of the first voltage input as long as the specified condition exists.

In a preferred embodiment of the present invention, the modulation circuit is a pulse width modulation circuit. The modulation circuit is provided with noninverted and inverted outputs. The noninverted output is coupled to the control input of the first switch; the inverted output is coupled to the control input of the second switch. Because the first and second switches have control inputs governing their state, the first and second switches are preferably solid state switches.

In a preferred embodiment of the present invention, the specified condition is a voltage of the regulator output being lower than a preset minimum voltage. Within this preferred embodiment, the regulator output power waveform transition control circuit preferably employs a comparison of a voltage of the regulator output to a voltage reference to determine a presence of the specified condition. Thus, a regulator output power waveform transition control circuit takes a voltage feedback signal from the regulator output. If that feedback signal indicates a regulator output voltage less than a desired minimum, the control circuit couples the regulator output to the higher voltage input, forcing the regulator output to track the first voltage input until the output exceeds the minimum.

In one embodiment of the present invention, a logic circuit is interposed between the modulation circuit and the switches. The logic circuit that, in a more preferred embodiment comprises a plurality of logic gates, causes the switches to disregard the switching signals upon receipt of the override signal. In another alternative embodiment of the present invention, the override signal disables an operation of the modulation circuit, forcing the switches to couple the regulator output to the first voltage input.

In a preferred embodiment of the present invention, a tank circuit is interposed between the switches and the regulator output. The tank circuit, preferably containing components such as in-line inductors and shunt capacitors, smoothes voltage transitions caused by the coupling by the switches to the first and second voltage inputs.

Preferably, the modulation circuit receives a feedback voltage signal from the regulator output, allowing the modulation circuit to adjust a duty cycle of the first and second switches to compensate for regulator output voltage deviations.

In a preferred embodiment of the present invention, the first voltage input is nominally 5 volts, the second voltage input is nominally ground, the voltage of the regulator output is nominally 3.3 volts and the preset minimum voltage is nominally 3 volts. This suits the regulator to supply power to a load comprising computer system circuitry coupled to the regulator output.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
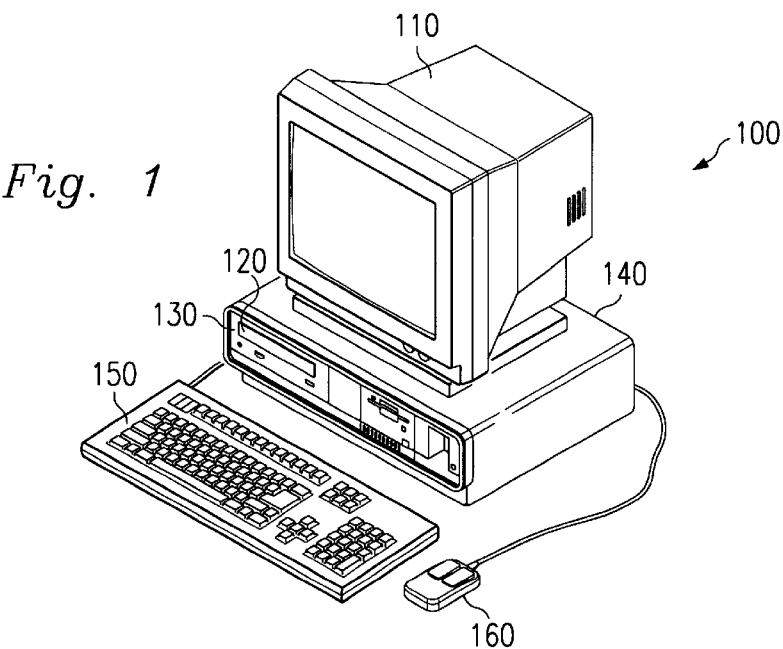
FIG. 1 illustrates an isometric view of a PC that serves as an environment within which the present invention can operate.

Referring initially to FIG. 1, illustrated is an isometric view of a PC 100 that provides an environment within which the present invention can operate. Since the present invention is not limited to application in a PC environment, however, FIG. 1 is illustrative only. The PC 100 includes a monitor or display device 110, a main chassis 120, within which are various electronic components of the PC 100 (not shown) and a keyboard 150. As previously described, the components require power to be delivered at both 5 and 3.3 volts.

The display device 110 and the keyboard 150 cooperate to allow communication between the PC 100 and a user. Also shown is a mouse 160. The mouse 160 provides a means by which the user can point to data displayed on the display device 110 to take action with respect thereto.

The main chassis 120 includes a dedicated hardware reset switch 130 adapted to trigger hardware reset circuitry (not shown) within the main chassis 120 to "reboot" or restart the PC 100 when the user depresses the reset switch 130. The main chassis 120 further includes a power switch 140 that is capable of interrupting power to the PC 100. Interruption and restoration of power also brings about a restart of the PC 100.

Figure 2:
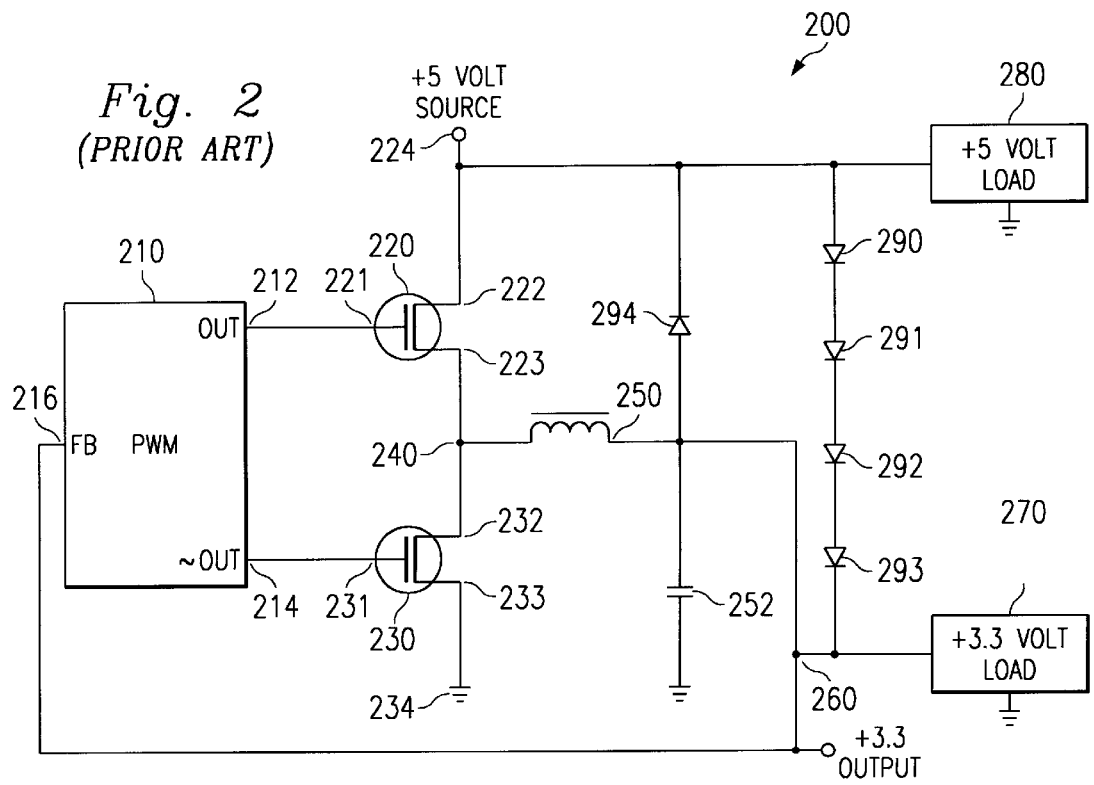
FIG. 2 illustrates a schematic diagram of a prior art voltage regulator employing a passive voltage difference limiting circuit.

Turning now to FIG. 2, illustrated is a schematic diagram of a prior art voltage regulator employing a passive voltage difference limiting circuit. The prior art regulator, generally designated 200, comprises a pulse width modulation ("PWM") circuit 210, having a noninverted output 212 and an inverted output 214. The noninverted output 212 is coupled to a control input 221 of a first solid state switch 220 having a node 222 thereof coupled to a 5 volt input 224. The inverted output 214 is coupled to a control input 231 of a second solid state switch 230 having a node 233 thereof coupled to an electrical ground 234. Remaining nodes 233, 232 of the first and second switches 220, 230, respectively, are coupled together at a point 240.

The PWM modulation circuit 210 feeds synchronous switching signals to the control inputs 221, 231 of the first and second switches 220, 230, causing the first and second switches 220, 230 to switch alternatively, coupling the point 240 alternatively to the 5 volt input 224 and the ground 234. This action produces a square waveform signal at the point 240.

An LC tank filter consisting of an inductor 250 and a shunt capacitor 252 is coupled to the point 240, providing a smoothing and filtering of the square waveform present at the point 240. The filtered waveform is presented at a regulator output 260, where it is made available to power a 3.3 volt load 270. A feedback path from the regulator output 260 to an input 216 on the PWM modulation circuit 210 allows the modulation circuit to adjust for variations in voltage at the regulator output 260 caused by variations in 3.3 volt load 270 impedance. A 5 volt load 280 can be coupled directly to the 5 volt input 224 to provide power thereto.

As previously described, when the regulator 200 is first switched on, the 5 volt input 224 comes up to its nominal voltage almost immediately, but it takes time for the voltage at the regulator output 260 to rise to the proper 3.3 volt level. This causes a temporary excessive voltage difference to exist between the input 224 and the output 260, damaging or destroying components such as the first and second switches 220, 230 within the regulator 200. Likewise, at power-down, the regulator output 260 voltage drops more rapidly than the 5 volt input 224, again causing a harmful excess voltage difference to occur.

The regulator 200 therefore is provided with bidirectional diodes bridging the 5 volt input 224 and the regulator output 260 to limit the amount of voltage difference that is allowed to exist. These bidirectional diodes take the form of four serially-coupled diodes 290, 291, 292, 293 biased toward the regulator output 260 and a singly diode 294 biased toward the 5 volt input 224. Unfortunately, as previously mentioned, the diode protection amounts to a simple limit on the maximum amount of voltage difference that will be tolerated, rather than providing an active control of voltage difference during the transition.

Besides failing to provide an active control of voltage differences, the prior art passive diode "protection" suffered two other notable disadvantages. First, the diodes' 290, 291, 292, 293, 294 forward voltage response curves varied drastically over forward current, allowing the maximum tolerable voltage difference to vary wildly. Second, I²T limits inherent in the diodes 290, 291, 292, 293, 294 were sometimes exceeded during conditions of overcurrent or short circuit in the 3.3 volt load 270, causing the diodes 290, 291, 292, 293, 294 to fail open or shorted, defeating their function and subjecting the sensitive electronic components of the 3.3 volt load 270 to unacceptable power quality.

Figure 3:
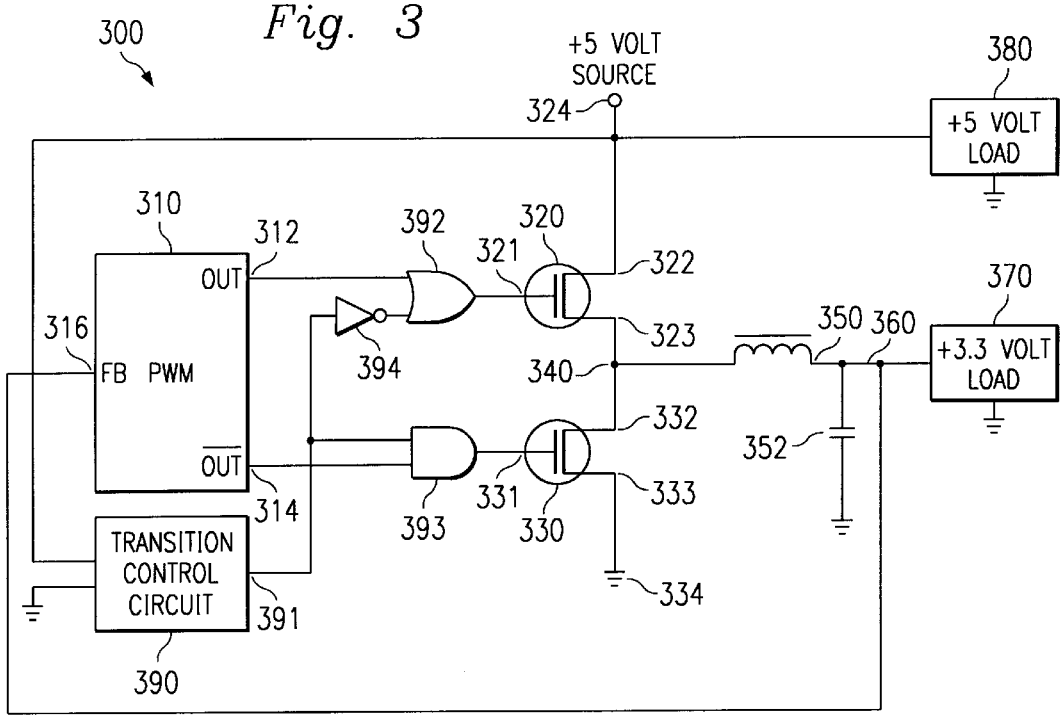
FIG. 3 illustrates a schematic diagram of a voltage regulator employing an active voltage difference control of the present invention.

Turning now to FIG. 3, illustrated is a schematic diagram of a voltage regulator employing an active voltage difference control of the present invention. The voltage regulator, generally designated 300, comprises a pulse width modulation ("PWM") circuit 310, having a noninverted output 312 and an inverted output 314. During normal operation, when the voltage regulator 300 is not in transition, the noninverted output 312 is coupled to a control input 321 of a first solid state switch 320 having a node 322 thereof coupled to a 5 volt input 324. Likewise, during normal operation, the inverted output 314 is coupled to a control input 331 of a second solid state switch 330 having a node 333 thereof coupled to an electrical ground 334. Remaining nodes 333, 332 of the first and second switches 320, 330, respectively, are coupled together at a point 340.

The PWM modulation circuit 310 feeds synchronous switching signals to the control inputs 321, 331 of the first and second switches 320, 330, causing the first and second switches 320, 330 to switch alternatively, coupling the point 340 alternatively to the 5 volt input 324 and the ground 334. This action produces a square waveform signal at the point 340.

An LC tank filter consisting of an inductor 350 and a shunt capacitor 352 is coupled to the point 340, providing a smoothing and filtering of the square waveform present at the point 340. The filtered waveform is presented at a regulator output 360, where it is made available to power a 3.3 volt load 370. A feedback path from the regulator output 360 to an input 316 on the PWM modulation circuit 310 allows the modulation circuit to adjust for variations in voltage at the regulator output 360 caused by variations in 3.3 volt load 370 impedance. A 5 volt load 380 can be coupled directly to the 5 volt input 324 to provide power thereto.

As previously described, when the regulator 300 is first switched on, the 5 volt input 324 comes up to its nominal voltage almost immediately, but it takes time for the voltage at the regulator output 360 to rise to the proper 3.3 volt level. This could cause a temporary excessive voltage difference to exist between the input 324 and the output 360, damaging or destroying components such as the computer's CPU and other spike-sensitive components. Likewise, at power-down, the regulator output 360 voltage drops more rapidly than the 5 volt input 324, that again could cause a harmful excess voltage difference to occur.

However, the present invention provides a regulator output power waveform transition control circuit 390 that actively controls the voltage at the regulator output 360 to prevent such from happening. Under a specified condition, to be described more particularly in conjunction with FIG. 4, the circuit 390 produces an override signal, ~COUPLE ("~COUPLE" indicating "NOT COUPLE"), at an output 391 thereof that, when inactivated low, disables the normal operation of the modulation circuit 310 with respect to the first and second switches 320, 330, forcing the switches 320, 330 to act independently of a state of the switching signals.

The override signal is illustrated as being able to override operation of the switching signals in the following manner. A logic circuit, preferably comprising a plurality of logic gates, tests the state of the override signal and the switching signals. Specifically, an OR gate 392 receives one switching signal from the noninverted output 312 of the modulation circuit 310 and an inverted ~COUPLE override signal (inverted in a NOT gate 394). The result of the OR operation is fed to the control input 321 of the first switch 320. Likewise, an AND gate 393 receives another switching signal from the inverted output 314 of the modulation circuit 310 and the ~COUPLE override signal. The result of the AND operation is fed to the control input 331 of the first switch 330. Table 1, below shows a truth table for the logic circuit, where OUT is the noninverted switching signal, ~OUT is the inverted switching signal, ~COUPLE is the ~COUPLE override signal, OR is the OR gate output, AND is the AND gate output, ACTION is the effect on the point 340 and RESULT details any deviation from the normal synchronous switching signal pattern due to the action of the ~COUPLE override signal.

TABLE 1

| OUT | ~OUT | ~COUPLE | OR | AND | ACTION | RESULT |
|---|---|---|---|---|---|---|
| 0 | 1 | 0 | 1 | 0 | Couple High | Forced High |
| 0 | 1 | 1 | 0 | 1 | Couple Low | Unchanged |
| 1 | 0 | 0 | 1 | 0 | Couple High | Unchanged |
| 1 | 0 | 1 | 1 | 0 | Couple High | Unchanged |

It can be seen in Table 1 that the switching signals govern the state of the switches 320, 330 unless the ~COUPLE override signal is low. In such case, the point 340 is coupled high (to the 5 volt input 324), regardless of what the switching signals may otherwise command. When the point 340 is coupled high, the regulator output 360 is tied to the 5 volt input 324 and thus track its slew rate, eliminating any appreciable voltage difference across the regulator 300 during transitions.

Figure 4:
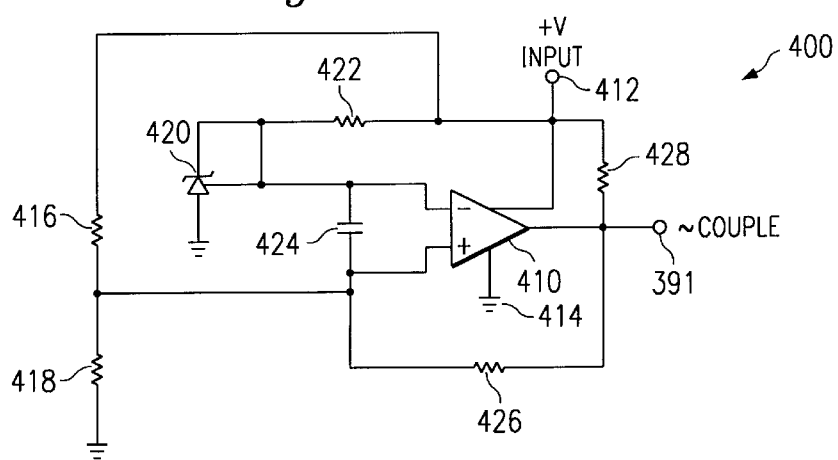
FIG. 4 illustrates a schematic diagram of a regulator output power waveform transition control circuit that is a portion of the active voltage difference control of FIG. 4.

Turning now to FIG. 4, illustrated is a schematic diagram of a regulator output power waveform transition control circuit that is a portion of the active voltage difference control of FIG. 4. FIG. 4 is presented for the purpose of establishing under what circumstances the ~COUPLE override signal of FIG. 3 is enabled. Thus, FIG. 4 illustrates a circuit that defines, in the illustrated embodiment, what the "specified condition" is.

The regulator output power waveform transition control circuit, generally designated 400, comprises a comparator 410 coupled between a voltage input 412 and an electrical ground 414. The voltage input 412 is coupled to the 5 volt input 324. A first resistor 416 and a second resistor 418 are arranged as a voltage divider to define at what voltage level of the voltage input 412 the ~COUPLE override signal is to be generated. This voltage, obtained at a point between the first and second resistors 416, 418, is fed to a noninverted input of the comparator 410. A shunt regulator 420 establishes a stable voltage reference that is fed to an inverted input of the comparator 410. Third and fourth resistors 422, 428 function as pull-up resistors. A capacitor 424 is coupled between the noninverted and inverted inputs of the comparator 410. Finally, a fifth resistor 426 provides a minor amount of feedback for the comparator 410.

In one embodiment of the present invention, the first resistor 416 is 500Ω, The second resistor 418 is 2.5 kΩ, the third resistor 422 is 1 kΩ (yielding a preset minimum voltage of approximately 3.0 volts), the fourth resistor 428 is 1 kΩ, the fifth resistor is 100 kΩ, the capacitor 424 is 0.01 μF and the shunt regulator 420 is a TL431 manufactured by Texas Instruments.

The regulator output power waveform transition control circuit 400 allows the ~COUPLE override signal to transition from low to high when the voltage input 412 (the 5 volt input 324 of FIG. 3) slews up to about 3.0 volts. When the ~COUPLE override signal is low, the 3.3 volt regulator output 360 is tightly coupled to the 5 volt input 324. Thus, the regulator output 360 and the 5 volt input 324 will have parallel waveforms for the critical transition periods of start-up and shutdown. Above about 3.0 volts of the 5 volt input 324, the modulation circuit 310 operates in a normal synchronous fashion to control the voltage of the regulator output 360.

Figure 5:
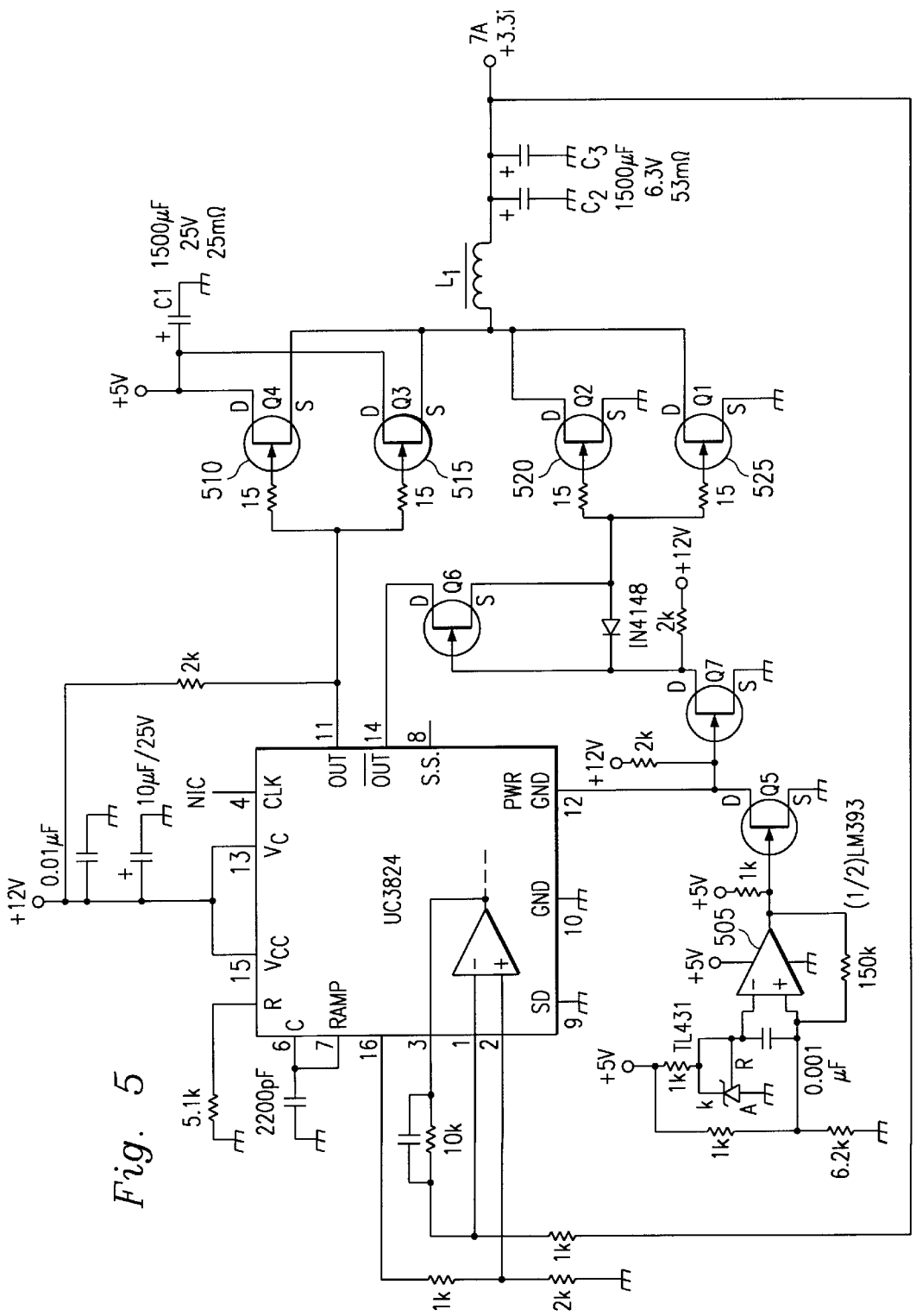
FIG. 5 illustrates a schematic diagram of an implementation of the voltage regulator of FIG. 3.

Turning now to FIG. 5, illustrated is a schematic diagram of an implementation of the voltage regulator of FIG. 3.

In the implementation illustrated in FIG. 5, the override signal disables an operation of the modulation circuit, rather than interposing a logic circuit to cause the switches to ignore the output of the modulation circuit, forcing the switches to couple the regulator output to the first voltage input. Specifically, when the output of a comparator 505 goes low, $Q_5$ turns off, allowing pin 12 of the UC3824 modulation circuit to float, thereby forcing switches 510, 515 on and coupling the regulator output high. Also, when the output of a comparator 505 goes low, $Q_7$ turns on, turning off $Q_6$ and forcing switches 520, 525 off, thereby preventing the regulator output from being coupled to ground.

The implementation employs an industry-standard 3824 PWM integrated circuit chip as the modulation circuit 310. $L_1$ is an inductor having 14 turns of #16 AWG wire on a 77120 core (such is commercially available from Magnetics, Inc.). $C_1$ is a Nichicon UPY1E152MHH capacitor. $C_2$ and $C_3$ are Nichicon UPY0J152MPH capacitors. $Q_1$, $Q_2$, $Q_3$ and $Q_4$ are Si9410Dy field effect transistors ("FETs"). $Q_5$ and $Q_6$ are each ½ of a single Si9955DY device. $Q_7$ is a 2N7002 FET. The other components of the voltage regulator 300 are of a type and value as indicated.

From the above description, it is apparent that the present invention provides a switching voltage regulator and a method of providing transition control therein. The regulator comprises: (1) a modulation circuit for generating switching signals, (2) first and second switches coupled between a regulator output of the voltage regulator and respective first and second voltage inputs, control inputs of the switches coupled to the modulation circuit to allow the switches to couple the regulator output alternately between the voltage inputs as a function of a state of the switching signals and (3) a regulator output power waveform transition control circuit coupled to the control inputs of the switches for generating an override signal to the control inputs under a specified condition, the override signal causing the switches to couple the regulator output to the first voltage input independent of the state of the switching signals.

Although the present invention and its advantages have been described in detail, it should be understood that various changes, substitutions and alterations can be made herein without departing from the spirit and scope of the invention as defined by the appended claims.

What is claimed is:

1. A switching voltage regulator, comprising:
    a modulation circuit for generating switching signals coupled between a regulator output of said voltage regulator and respective first and second voltage inputs, control inputs of said switches coupled to said modulation circuit to allow said switches to couple said regulator output alternately between said voltage inputs as a function of a state of said switching signals; and
    a regulator output power waveform transition control circuit coupled to said control inputs of said switches for generating an override signal to said control inputs when said voltage of said regulator output is lower than a preset minimum voltage, said override signal causing said switches to couple said regulator output to said first voltage input independent of said state of said switching signals.

2. The regulator as recited in claim 1, wherein said modulation circuit is a pulse width modulation circuit.

3. The regulator as recited in claim 1, wherein said first voltage input is of higher voltage than said second voltage input.

4. The regulator as recited in claim 1, wherein said regulator output power waveform transition control circuit employs a comparison of a voltage of said regulator output to a voltage reference to determine a presence of said specified condition.

5. The regulator as recited in claim 1, further comprising a logic circuit interposed between said modulation circuit and said switches causes said switches to disregard said switching signals upon receipt of said override signal.

6. The regulator as recited in claim 1, wherein said first and second switches are solid state switches.

7. The regulator as recited in claim 1, wherein a voltage of said regulator output is between voltages of said first and second voltage inputs.

8. The regulator as recited in claim 1, further comprising a tank circuit interposed between said switches and said regulator output for smoothing voltage transitions caused by said coupling by said switches.

9. The regulator as recited in claim 1, wherein a noninverted output of said modulation circuit is coupled to said control input of said first switch and an inverted output of said modulation circuit is coupled to said control input of said second switch.

10. A method of providing transition control in a switching voltage regulator, comprising the steps of:

providing first and second switches coupled between a regulator output of said voltage regulator and respective first and second voltage inputs, control inputs of said switches coupled to a modulation circuit;

generating switching signals with said modulation circuit;

coupling said regulator output alternately between said voltage inputs as a function of a state of said switching signals; and generating an override signal to said control inputs when said voltage of said regulator output is lower than a preset minimum voltage with a regulator output power waveform transition control circuit coupled to said control inputs of said switches, said override signal causing said switches to couple said regulator output to said first voltage input independent of said state of said switching signals.

11. The method as recited in claim 10, wherein said step of providing comprises the step of providing a pulse width modulation circuit.

12. The method as recited in claim 10, wherein said step of providing comprises the step of providing a first voltage input of higher voltage than a second voltage input.

13. The method as recited in claim 10, further comprising the step of causing said switches to disregard said switching signals upon receipt of said override signal with a logic circuit interposed between said modulation circuit and said switches.

14. The method as recited in claim 10, wherein said step of providing comprises the step of providing solid state first and second switches.

15. The method as recited in claim 10, wherein said step of coupling produces a voltage of said regulator output that is between voltages of said first and second voltage inputs.

16. The method as recited in claim 10, further comprising the step of smoothing voltage transitions caused by said coupling by said switches with a tank circuit interposed between said switches and said regulator output.

17. The method as recited in claim 10, wherein said step of providing comprises the steps of:

coupling a noninverted output of said modulation circuit to said control input of said first switch; and coupling an inverted output of said modulation circuit to said control input of said second switch.

18. The method as recited in claim 10, wherein said step of generating said override signal comprises the step of employing a comparison of a voltage of said regulator output to a voltage reference to determine a presence of said specified condition.

19. A step-down switching voltage regulator, comprising:

a pulse width modulation circuit for generating switching signals;

first and second solid state switches coupled between a regulator output of said voltage regulator and respective first and second voltage inputs, said first voltage input of higher voltage than said second voltage input, control inputs of said switches coupled to said modulation circuit to allow said switches to couple said regulator output alternately between said voltage inputs as a function of a state of said switching signals, a voltage of said regulator output being between voltages of said first and second voltage inputs; and a regulator output power waveform transition control circuit coupled to said control inputs of said switches for generating an override signal to said control inputs when a voltage of said regulator output is lower than a preset minimum voltage, said override signal causing said switches to couple said regulator output to said first voltage input independent of said state of said switching signals.

20. The regulator as recited in claim 19, further comprising a logic circuit interposed between said modulation circuit and said switches causes said switches to disregard said switching signals upon receipt of said override signal.

21. The regulator as recited in claim 19, further comprising a tank circuit interposed between said switches and said regulator output for smoothing voltage transitions caused by said coupling by said switches.

22. The regulator as recited in claim 19, wherein a noninverted output of said modulation circuit is coupled to said control input of said first switch and an inverted output of said modulation circuit is coupled to said control input of said second switch.

23. The regulator as recited in claim 19, wherein said regulator output power waveform transition control circuit employs a comparison of a voltage of said regulator output to a voltage reference to determine when said voltage of said regulator output is lower than said preset minimum voltage.

24. The regulator as recited in claim 19, wherein said modulation circuit receives a feedback voltage signal from said regulator output.

25. The regulator as recited in claim 19, wherein said first voltage input is nominally 5 volts.

26. The regulator as recited in claim 19, wherein said voltage of said regulator output is nominally 3.3 volts.

27. The regulator as recited in claim 19, wherein said preset minimum voltage is nominally 3 volts.

28. The regulator as recited in claim 19, further comprising a load comprising computer system circuitry coupled to said regulator output.

29. A method of providing transition control in a switching voltage regulator, comprising the steps of:

providing first and second solid state switches coupled between a regulator output of said voltage regulator and respective first and second voltage inputs, said first voltage input being of higher voltage than said second voltage input, control inputs of said switches coupled to a pulse width modulation circuit;

generating switching signals with said modulation circuit;

coupling said regulator output alternately between said voltage inputs as a function of a state of said switching signals, a voltage of said regulator output being between voltages of said first and second voltage inputs; and generating an override signal to said control inputs when a voltage of said regulator output is lower than a preset minimum voltage with a regulator output power waveform transition control circuit coupled to said control inputs of said switches, said override signal causing said switches to couple said regulator output to said first voltage input independent of said state of said switching signals.

30. The method as recited in claim 29, further comprising the step of causing said switches to disregard said switching signals upon receipt of said override signal with a logic circuit interposed between said modulation circuit and said switches.

31. The method as recited in claim 29, further comprising the step of smoothing voltage transitions caused by said coupling by said switches with a tank circuit interposed between said switches and said regulator output.

32. The method as recited in claim 29, wherein said step of providing comprises the steps of:

coupling a noninverted output of said modulation circuit to said control input of said first switch; and coupling an inverted output of said modulation circuit to said control input of said second switch.

33. The method as recited in claim 29, wherein said step of generating said override signal comprises the step of employing a comparison of a voltage of said regulator output to a voltage reference to determine whether said voltage of said regulator output is lower than said preset minimum voltage.

34. The method as recited in claim 29, further comprising the step of receiving a feedback voltage signal from said regulator output into said modulation circuit.

35. The method as recited in claim 29, wherein said step of providing comprises the step of providing a first voltage input of nominally 5 volts.

36. The method as recited in claim 29, wherein said step of coupling comprises the step of coupling said regulator output to provide a voltage of said regulator output of nominally 3.3 volts.

37. The method as recited in claim 29, wherein said step of generating said override signal comprises the step of generating an override signal when said voltage of said regulator output is lower than a preset minimum voltage of nominally 3 volts.

38. The method as recited in claim 29, further comprising the step of coupling a load comprising computer system circuitry to said regulator output.

39. A step-down switching voltage regulator for a computer system, comprising:

a pulse width modulation circuit for generating switching signals;

first and second solid state switches coupled between a regulator output of said voltage regulator and respective first and second voltage inputs, said first voltage input of higher voltage than said second voltage input, a noninverted output of said modulation circuit coupled to a control input of said first switch and an inverted output of said modulation circuit coupled to a control input of said second switch to allow said switches to couple said regulator output alternately between said voltage inputs as a function of a state of said switching signals, a voltage of said regulator output being between voltages of said first and second voltage inputs, said modulation circuit receiving a feedback voltage signal from said regulator output;

a tank circuit interposed between said switches and said regulator output for smoothing voltage transitions caused by said coupling by said switches; and a regulator output power waveform transition control circuit coupled to said control inputs of said switches for generating an override signal to said control inputs when a voltage of said regulator output is lower than a preset minimum voltage, said regulator output power waveform transition control circuit employing a comparison of a voltage of said regulator output to a voltage reference to determine when said voltage of said regulator output is lower than said preset minimum voltage, said override signal causing said switches to couple said regulator output to said first voltage input independent of said state of said switching signals; and a load comprising computer system circuitry coupled to said regulator output.

40. The regulator as recited in claim 39, further comprising a logic circuit interposed between said modulation circuit and said switches causes said switches to disregard said switching signals upon receipt of said override signal.

41. The regulator as recited in claim 39, wherein said first voltage input is nominally 5 volts.

42. The regulator as recited in claim 39, wherein said voltage of said regulator output is nominally 3.3 volts.

43. The regulator as recited in claim 39, wherein said preset minimum voltage is nominally 3 volts.

44. A method of providing transition control in a switching voltage regulator for a computer system, comprising the steps of:

providing first and second solid state switches coupled between a regulator output of said voltage regulator and respective first and second voltage inputs, said first voltage input being of higher voltage than said second voltage input, a noninverted output of a modulation circuit coupled to a control input of said first switch and an inverted output of said modulation circuit coupled to a control input of said second switch;

generating switching signals with said modulation circuit;

coupling said regulator output alternately between said voltage inputs as a function of a state of said switching signals, a voltage of said regulator output being between voltages of said first and second voltage inputs;

smoothing voltage transitions caused by said coupling by said switches with a tank circuit interposed between said switches and said regulator output;

receiving a feedback voltage signal from said regulator output into said modulation circuit;

generating an override signal to said control inputs when a voltage of said regulator output is lower than a preset minimum voltage with a regulator output power waveform transition control circuit coupled to said control inputs of said switches, said regulator output power waveform transition control circuit employing a comparison of a voltage of said regulator output to a voltage reference to determine when said voltage of said regulator output is lower than said preset minimum voltage, said override signal causing said switches to couple said regulator output to said first voltage input independent of said state of said switching signals; and coupling a load comprising computer system circuitry to said regulator output.

45. The method as recited in claim 44, further comprising the step of causing said switches to disregard said switching signals upon receipt of said override signal with a logic circuit interposed between said modulation circuit and said switches.

46. The method as recited in claim 44, wherein said step of providing comprises the step of providing a first voltage input of nominally 5 volts.

47. The method as recited in claim 44, wherein said step of coupling comprises the step of coupling said regulator output to provide a voltage of said regulator output of nominally 3.3 volts.

48. The method as recited in claim 44, wherein said step of generating said override signal comprises the step of generating an override signal when said voltage of said regulator output is lower than a preset minimum voltage of nominally 3 volts.

* * * * *